United States Patent [19]
Liu et al.

[11] Patent Number: 5,671,168
[45] Date of Patent: Sep. 23, 1997

[54] DIGITAL FREQUENCY-DOMAIN IMPLEMENTATION OF ARRAYS

[75] Inventors: Chen Liu, Tianjin, China; Samuel Sideman, Haifa, Israel

[73] Assignee: Technion Research & Development Foundation Ltd., Israel

[21] Appl. No.: 498,846

[22] Filed: Jul. 6, 1995

[51] Int. Cl.$^6$ .............................. G06F 17/10; G06F 15/00
[52] U.S. Cl. ........................................ 364/724.18; 364/726
[58] Field of Search ..................... 364/724.18, 725–726

[56] References Cited

U.S. PATENT DOCUMENTS

| | | | |
|---|---|---|---|
| 4,100,604 | 7/1978 | Perreault | 364/724.18 |
| 4,207,624 | 6/1980 | Dentino et al. | 364/724.18 |
| 4,559,605 | 12/1985 | Norsworthy | 364/726 |
| 4,811,264 | 3/1989 | Hershberger | 364/724.18 |
| 5,524,149 | 6/1996 | Frenzel | 364/724.18 |

OTHER PUBLICATIONS

Allen, J.B., and Rabiner, L.R. (1977). "A Unified Approach To Short–Time Fourier Analysis and Synthesis," Proc. IEEE 65, 1558–1564.
Armijo, L., Daniel, K.W., and Labuda, W.M. (1974). "Applications of the FFT to Antenna Array Beamforming," Proc. IEEE Electronics and Aerospace Systems Convention EASCON '74, Washington DC, 381–383.
Barton, P. (1980). "Digital Beam Forming for Radar," IEE Proc. F. 127, 266–277.
Chang, J.H., and Tuteur, F.B. (1971). "A New Class of Adaptive Array Processors," J. Acoust. Soc. Am. 49, 639–649.
DeMuth, G.L. (1977). "Frequency Domain Beamforming Techniques," Proc. IEEE Int. Conf. on Acoustics, Speech, And Signal Process. ICASSP '77, Hartford, CT, 713–715.
Dudgeon, D.E. (1977). "Fundamentals of Digital Array Processing," Proc. IEEE 65, 898–904.
Fraser, D. (1989). "Interpolation by the FFT Revisted—An Experimental Investigation, " IEEE Trans. Acoust. Speech Signal Process. ASSP–37, 665–675.
Godara, L.C. (1985). "The Effect of Phase–Shifter Errors on the Performance of an Antenna–Array Beamformer, " IEEE J. Oceanic Eng. OE–10, 278–284.
Haykin, S., Editor, (1985). Array Signal Processing (Prentice–Hall, Englewood Cliffs, NJ).
Knight, W.C., Pridham, R.G., and Kay, S.M. (1981). "Digital Signal Processing for Sonar, " Proc. IEEE 69, 1451–1506.
Markel, J.D. (1971). "FFT Pruning, " IEEE Trans. Audio and Electroacoust. AU–19, 305–311.
Monzingo, R.A., and Miller, T.W.. (1980). Introduction To Adaptive Arrays (John Wiley and Sons, New York), pp. 105–128.
Mucci, R.A. (1984). "A Comparison of Efficient Beamforming Algorithms, " IEEE Trans. Acoust. Speech Signal Process. ASSP–32, 548–558.

(List continued on next page.)

*Primary Examiner*—Tan V. Mai
*Attorney, Agent, or Firm*—Oppenheimer Poms Smith

[57] ABSTRACT

A method for the digital frequencey domain implementation of receiving arrays. The steps of the method are as follows: a discrete time input signal is transformed into its spectral components and the redundant spectral components are removed. Products of the non-redundant spectral components with a scaled set of acquired weights are computed. From the so-computed products a first set of spectral sums is calculated wherefrom a second set of spectral sums is derived. Thereafter, the first and second sets of spectral sums are converted to the discrete time domain thereby obtaining a discrete time output signal. The invention also provides a system having receiving components operating in accordance with the method. In another embodiment the invention also provides a method and system for the digital frequency domain implementation of transmitting arrays.

47 Claims, 8 Drawing Sheets

OTHER PUBLICATIONS

Nagai, K. (1986). "Pruning The Decimation–In–Time FFT Algorithm With Frequency Shift," IEEE Trans. Acoust. Speech Signal Process. ASSP–34, 1008–1010.

Oppenheim, A.V., and Schafer, R.W. (1989). Discrete–Time Signal Processing (Prentice–Hall, Englewood Cliffs, NJ).

Pitt, S.P. Adams, W.T., and Vaughan, J.K. (1978). "Design and Implementation of a Digital Phase Shift Beamformer," J. Acoust. Soc. Am. 64, 808–814.

Prasad, K.P., and Satyanarayana, P. (1986). "Fast Interpolation Algorithm Using FFT," Electron. Lett. 22, 185–187.

Pridham, R.G., and Mucci, R.A. (1978). "A Novel Approach to Digital Beamforming," J. Acoust. Soc. Am. 63, 425–434.

Pridham, R.G., and Mucci, R.A. (1979). "Shifted Sideband Beamformer, " IEEE Trans. Acoust. Speech Signal Process. ASSP–27, 713–722.

Quazi, A.H. (1982). "Array Beam Response in the Presence of Amplitude and Phase Fluctuations, " J. Acoust. Soc. Am. 72, 171–180.

Robertson, W., and Pincock, D. (1987). "A New Architecture for Digital Time Domain Beamforming," IEEE Trans. Acoust. Speech Signal Process. ASSP–35, 1761–1773.

Rudnick, P. (1969), "Digital Beamforming in the Frequency Domain," J. Acoust. Soc. A.M. 46, 1089–1090.

Schafer, R.W., and Rabiner, L.R. (1973). "A Digital Signal Processing Approach to Interpolation," Proc. IEEE 61, 692–702.

Shannon, C.E. (1949). "Communication in the Presence of Noise," Proc. IRE 37, 10–21.

Skinner, D.P. (1976). "Pruning the Decimation In–Time FFT Algorithm," IEEE Trans. Acoust. Speech Signal Process. ASSP–24, 193–194.

Sreenivas, T.V., and Rao, P.V.S. (1979). "FFT Algorithm for Both Input and Output Pruning," IEEE Trans. on Acoust. Speech Signal Process. ASSP–27, 291–292.

Van Trees, H.L. (1968). Detection, Estimation and Modulation Theory, Part 1 (John Wiley and Sons, New York).

Viral A.M. (1975). "An Overview of Adaptive Array Processing for Sonar Applications," Proc. IEEE Electronics and Aerospace Systems Convention. EASCON '75, Washington DC, 34–A—34–M.

Williams, J.R. (1968). "Fast Beam–Forming Algorithm," J. Acoust. Soc. Am. 44, 1454–1455.

DIGITAL FREQUENCY-DOMAIN IMPLEMENTATION OF ARRAYS

FIELD OF THE INVENTION

This invention relates to a digital frequency-domain implementation of arrays.

PRIOR ART

The following is a list of references which are believed to be pertinent as prior art to the present invention:

Allen, J. B., and Rabiner, L. R. (1977). "A unified approach to short-time Fourier analysis and synthesis," Proc. IEEE 65, 1558–1564.

Armijo, L., Daniel, K. W., and Labuda, W. M. (1974). "Applications of the FFT to antenna array beamforming," Proc. IEEE Electronics and Aerospace Systems Convention EASCON '74, Washington D.C., 381–383.

Barton, P. (1980). "Digital beam forming for radar," IEE Proc. F. 127, 266–277.

Chang, J. H., and Tuteur, F. B. (1971). "A new class of adaptive array processors," J. Acoust. Soc. Am. 49, 639–649.

DeMuth, G. L. (1977). "Frequency domain beamforming techniques," Proc. IEEE Int. Conf. on Acoustics, Speech, and Signal Process. ICASSP '77, Hartford, Conn., 713–715.

Dudgeon, D. E. (1977). "Fundamentals of digital array processing," Proc. IEEE 65, 898–904.

Fraser, D. (1989). "Interpolation by the FFT revisited—An experimental investigation," IEEE Trans. Acoust. Speech Signal Process. ASSP-37, 665–675.

Godara, L. C. (1985). "The effect of phase-shifter errors on the performance of an antenna-array beamformer," IEEE J. Oceanic Eng. OE-10, 278–284.

Haykin, S., Editor, (1985). Array Signal Processing (Prentice-Hall, Englewood Cliffs, N.J.).

Knight, W. C., Pridham, R. G., and Kay, S. M. (1981). "Digital signal processing for sonar," Proc. IEEE 69, 1451–1506.

Markel, J. D. (1971). "FFT pruning," IEEE Trans. Audio and Electroacoust. AU-19, 305–311.

Monzingo, R. A., and Miller, T. W.(1980). Introduction to Adaptive Arrays (John Wiley and Sons, New York), pp. 105–128.

Mucci, R. A. (1984). "A comparison of efficient beamforming algorithms," IEEE Trans. Acoust. Speech Signal Process. ASSP-32, 548–558.

Nagai, K. (1986). "Pruning the decimation-in-time FFT algorithm with frequency shift," IEEE Trans. Acoust. Speech Signal Process. ASSP-34, 1008–1010.

Oppenheim, A. V., and Schafer, R. W. (1989). Discrete-Time Signal Processing (Prentice-Hall, Englewood Cliffs, N.J.).

Pitt, S. P., Adams, W. T., and Vaughan, J. K. (1978). "Design and implementation of a digital phase shift beamformer," J. Acoust. Soc. Am. 64, 808–814.

Prasad, K. P., and Satyanarayana, P. (1986). "Fast interpolation algorithm using FFT," Electron. Lett. 22, 185–187.

Pridham, R. G., and Mucci, R. A. (1978). "A novel approach to digital beamforming," J. Acoust. Soc. Am. 63, 425–434.

Pridham, R. G., and Mucci, R. A. (1979). "Shifted sideband beamformer," IEEE Trans. Acoust. Speech Signal Process. ASSP-27, 713–722.

Quazi, A. H. (1982). "Array beam response in the presence of amplitude and phase fluctuations," J. Acoust. Soc. Am. 72, 171–180.

Robertson, W., and Pincock, D. (1987). "A new architecture for digital time domain beamforming," IEEE Trans. Acoust. Speech Signal Process. ASSP-35, 1761–1773.

Rudnick, P. (1969). "Digital beamforming in the frequency domain," J. Acoust. Soc. Am. 46, 1089–1090.

Schafer, R. W., and Rabiner, L. R. (1973). "A digital signal processing approach to interpolation," Proc. IEEE 61, 692–702.

Shannon, C. E. (1949). "Communication in the presence of noise," Proc. IRE 37, 10–21.

Skinner, D. P. (1976). "Pruning the decimation in-time FFT algorithm," IEEE Trans. Acoust. Speech Signal Process. ASSP-24, 193–194.

Sreenivas, T. V., and Rao, P. V. S. (1979). "FFT algorithm for both input and output pruning," IEEE Trans. on Acoust. Speech Signal Process. ASSP-27, 291–292.

Van Trees, H. L. (1968). Detection, Estimation and Modulation Theory, Part 1 (John Wiley and Sons, New York).

Vural, A. M. (1975). "An overview of adaptive array processing for sonar applications," Proc. IEEE Electronics and Aerospace Systems Convention. EASCON '75, Washington D.C., 34-A–34-M.

Williams, J. R. (1968). "Fast beam-forming algorithm," J. Acoust. Soc. Am. 44, 1454–1455.

The above references will be referred to herein by indicating, within brackets the name of the author and the year of publication.

BACKGROUND OF THE INVENTION

Beamforming is a technique for providing an array of transducers with discriminating directional receiving and, or, transmitting capability. This technique has been widely applied in the fields of radar, sonar, communications, ultrasonics and others (Haykin, 1985, pp. 1–2).

Viewed as spatial sampling and filtering, the beamforming procedure changes with the bandwidth of the signals to be received or transmitted; the signal bandwidth is roughly divided into narrowband and broadband, depending on whether the signal can be adequately characterized by a single frequency.

A narrowband beamforming array may be regarded as consisting of a complex weight in each channel (each sensor defines an array channel); a broadband beamforming array consists of a linear filter that is usually realized by a tapped-delay line with complex weights in each channel of the array (Chang and Tuteur, 1971; Monzingo and Miller, 1980, pp. 61–63). The implementation of the beamforming operation for a narrowband array is straightforward and has received much attention in the literature (Monzingo and Miller, 1980, p. 60). The implementation of a broadband array is, however, somewhat more complicated since, for convenience, the analysis and optimization of a broadband array are generally carried out in the frequency domain. Consequently, the optimal weights which are derived based on a certain performance criterion are functions of frequency (Monzingo and Miller, 1980, pp. 105–128; Vural, 1975). Clearly, implementation of these optimal weights in the time domain, if at all possible, will inevitably incur truncation errors, since the time domain equivalent of the optimum broadband beamforming weights are not necessarily of finite length (i.e. finite number of components).

Beamforming can be implemented in either an analog or a digital manner. Beamforming processes which are implemented with analog networks represent a traditional approach which still plays an important role in a variety of applications. However, the emergence of the extremely fast FFT (Fast Fourier Transform) and DSP (Digital Signal Processing) microcircuits (Robertson and Pincock, 1987) makes it possible to implement many sophisticated beamforming processes digitally, with the advantages of lower demands on hardware, smaller size, lower cost, and greater flexibility. Moreover, digital array processing lends itself to the use of powerful application-orientated signal processing techniques (Dudgeon 1977; Barton 1980; Knight et al. 1981). However, the key problem which hampers the digital implementation of arrays is that it requires a sampling rate significantly higher than the Nyquist rate (Shannon, 1949) to achieve sufficient accuracy in phase delays. Approaches of digital interpolation beamforming in the time domain (Robertson and Pincock 1987; Mucci 1984; Pridham and Mucci 1978) and digital phase shift beamforming in the frequency domain (Pitt et al. 1978; DeMuth 1977; Armijo et al. 1974; Rudnick 1969; Williams 1968) have been developed for implementation of narrowband optimum weights. To date, digital implementation of optimum broadband beamformers remains an open problem.

Digital implementation of optimum broadband beamformers faces the same problem as narrowband beamformers, i.e., coping with the trade-off between the sampling rate and digital processing complexity. In addition, broadband beamforming requires that each optimum set of weights is faithfully applied to the corresponding frequency components.

SUMMARY OF THE INVENTION

Improved resolution in both direction and frequency determination of a digital beamformer is achieved by increasing the number of samples of the digital signal. However, this results in increased processing complexity and an increase in the demand of data storage capacity. These issues are particularly problematic in the digital frequency domain implementation of broadband arrays.

It is an object of the present invention to provide a method and a system for the digital frequency-domain implementation of broadband arrays which offer improved resolution in both direction and frequency determination without necessitating sampling rates much higher than the Nyquist rate and therefore with almost no increase in the processing complexity and in the demand of data storage capacity.

In accordance with a first aspect of the present invention there is provided a method for the digital frequency domain implementation of receiving arrays which offers improved resolution in both direction and frequency determination without necessitating sampling rates of the received signal much higher than the Nyquist rate comprising the steps of:

transforming a discrete time input signal into its spectral components;

removing redundant spectral components;

computing products of non-redundant spectral components with a scaled set of acquired weights;

calculating from the so-computed products a first set of spectral sums;

deriving from said first set of spectral sums a second set of spectral sums;

converting said first and second set of spectral sums to the discrete time domain thereby obtaining a discrete time output signal.

Typically, the discrete time input signal is obtained by sampling a continuous time signal that is received by the receiving elements of the array, each element defining a channel.

Quite typically, the continuous time signal in each channel is sampled at a uniform sampling rate.

Further quite typically, the continuous time signal in each channel passes through an anti-aliasing filter before it is sampled.

Still further quite typically, said uniform sampling rate is substantially the Nyquist rate, which is defined as twice the highest frequency component of the spectrum of said continuous time signal.

Preferably, the discrete time input signal in each channel is transformed into N spectral components using an N-point discrete Fourier transform.

Generally, the last $N/2-1$ spectral components in each channel are redundant in the sense that they can be obtained by taking the complex conjugate of the first $N/2$ spectral components, barring the first spectral component that corresponds to zero frequency.

Quite generally, the first $N/2+1$ spectral components in each channel are non-redundant.

In accordance with the present invention the set of acquired weights in each channel of the array is an optimum set of weights which may be either deterministic or adaptive, corresponding to N spectral components, for phasing the elements of said array.

Further in accordance with the present invention, the weights of the set of weights in each channel are scaled both in amplitude and phase so as to correspond to $\alpha N$ spectral components, where $\alpha$ is an integer power of 2, thereby effectively increasing the sampling rate of the input signal by a factor of $\alpha$.

Generally, the products of the non-redundant spectral components in each channel with the scaled set of acquired weights are formed by multiplying the scaled weights of a given frequency and a given channel by the spectral components of the same frequency and the same given channel.

In accordance with a preferred embodiment of the present invention said first set of spectral sums is derived by summing separately for each non-redundant spectral component the corresponding products from each channel.

Further in accordance with a preferred embodiment of the present invention said second set of spectral sums is obtained from said first set of spectral sums by applying the operation of complex conjugation thereto, whereby the second element of said first set of spectral sums is identified with the last element of said second set of spectral sums, and the last element of said first set of spectral sums is identified with the first element of said second set of spectral sums, and the intermediate elements of the two sets are identified correspondingly.

In accordance with a preferred embodiment of the invention said first and second sets of spectral sums are transformed into the discrete time domain using an inverse discrete Fourier transform based on a pruned decimation-in-frequency structure fast Fourier transform.

If desired said discrete time output signal can undergo the further step of being re-scaled thereby restoring the scaling of the discrete time output signal to that of the input signal.

In accordance with a second aspect of the present invention there is provided a method for the digital frequency domain implementation of transmitting arrays which offers improved resolution in both direction and frequency determination without necessitating sampling rates of the signal to be transmitted much higher than the Nyquist rate comprising the steps of:

transforming a discrete time input signal into its spectral components;

removing redundant spectral components;

computing a first set of products, for each channel of the array, of non-redundant spectral components with a scaled set of acquired weights;

deriving from said first set of products a second set of products for each channel of the array; and converting said first and second sets of products to a discrete time output signal in each channel.

Typically, the discrete time input signal is obtained by sampling a continuous time signal.

Quite typically, the continuous time signal is sampled at a uniform sampling rate.

Further quite typically, the continuous time signal passes through an anti-aliasing filter before it is sampled.

Still further quite typically, said uniform sampling rate is substantially the Nyquist rate, which is defined as twice the highest frequency component of the spectrum of said continuous time signal.

Preferably, the discrete time input signal is transformed into N spectral components using an N-point discrete Fourier transform.

Generally, the last $N/2-1$ spectral components are redundant in the sense that they can be obtained by taking the complex conjugate of the first $N/2$ spectral components, barring the first spectral component which corresponds to zero frequency.

Quite generally, the first $N/2+1$ spectral components are non-redundant.

In accordance with the present invention the set of acquired weights in each channel of the array is an optimum set of weights which may be either deterministic or adaptive, corresponding to N spectral components, for phasing the elements of said array.

Further in accordance with the present invention, the weights of the set of weights in each channel are scaled both in amplitude and phase so as to correspond to $\alpha N$ spectral components, where $\alpha$ is an integer power of 2, whereby effectively increasing the sampling rate of the input signal by a factor of $\alpha$.

Generally, the first set of products of the non-redundant spectral components with the scaled set of acquired weights are formed by multiplying, for each value of frequency, the spectral components by weights corresponding to the same frequency, for each channel of the array.

Quite generally, said second set of products is acquired from said first set of products, for each channel of the array, by applying the operation of complex conjugation thereto, whereby the second element of said first set of products is identified with the last element of said second set of products, and the last element of said first set of products is identified with the first element of said second set of products, and the intermediate elements of the two sets are identified correspondingly.

In accordance with a preferred embodiment of the invention said first and second sets of products, for each channel, are transformed into the discrete time domain using an inverse discrete Fourier transform based on a pruned decimation-in-frequency structure fast Fourier transform.

If desired said discrete time output signal, in each channel, can undergo the further step of being re-scaled thereby restoring the scaling of the discrete time output signal, for each channel, to that of the input signal.

In accordance with the first aspect of the present invention there is also provided a system for the digital frequency domain implementation of receiving arrays which offers improved resolution in both direction and frequency determination without necessitating sampling rates of the received signal much higher than the Nyquist rate comprising:

spectral transforming means for transforming a discrete time input signal into its spectral components;

spectrum filtering means responsive to said spectral components and capable of passing non-redundant spectral components only;

computational means for computing products of said non-redundant spectral components with a scaled set of acquired weights;

summing means for calculating from the said computed products a first set of spectral sums;

means for deriving from said first set of spectral sums a second set of spectral sums; and processor means for converting said first and second sets of spectral sums to the discrete time domain thereby obtaining a discrete time output signal.

In a specific embodiment of the invention, said system for the digital frequency-domain implementation arrays further includes an analog to digital processor for converting a continuous time input signal to said discrete time input signal.

Generally, said analog to digital processor is preceded by an anti-aliasing filter.

Typically, said continuous time input signal is received by a sensor which precedes said anti-aliasing filter.

By one specific application said sensor is an antenna and said continuous time input signal is an electromagnetic signal.

By another specific application said sensor is associated with at least one of a microphone, a hydrophone, or a geophone and said continuous time input signal is an acoustic signal.

By a preferred embodiment of the invention said spectral transforming means is based on an N-point digital Fourier transform.

Generally, said spectrum filtering means is a processor which accepts an input array of spectral components and outputs only part of the input array.

Typically, said means for deriving said second set of spectral sums from said first set of spectral sums is a processor based on applying the operation of complex conjugation to said first set of spectral sums.

In accordance with the present invention said processor means for converting said first and second sets of spectral sums to said discrete time output signal is based on a pruned decimation-in-frequency structure fast Fourier transform.

If desired, said processor means for converting said first and second sets of spectral sums to said discrete time output signal can be followed by a further processor for scaling up said discrete time output signal in order to restore the scaling of said discrete time output signal to that of the input signal.

Also if desired, said further processor for scaling up said discrete time output signal can be followed by a digital to analog processor in order to convert said discrete time signal having original scaling to a continuous time output signal.

In accordance with the second aspect of the present invention there is also provided a system for the digital frequency domain implementation of transmitting arrays which offers improved resolution in both direction and frequency determination without necessitating sampling rates of the signal to be transmitted much higher than the Nyquist rate comprising:

spectral transforming means for transforming a discrete time input signal into its spectral components;

spectrum filtering means responsive to said spectral components and capable of passing non-redundant spectral components only;

computational means for computing a first set of products, for each channel of the array, of said non-redundant spectral components with a scaled set of acquired weights;

means for deriving from said first set of products a second set of products for each channel of the array; and processor means for converting said first and second sets of products to a discrete time domain output signal in each channel of the array.

In a specific embodiment of the invention, said system for the digital frequency-domain implementation arrays further includes an analog to digital processor for converting a continuous time input signal to said discrete time input signal.

Generally, said analog to digital processor is preceded by an anti-aliasing filter.

By a preferred embodiment of the invention said spectral transforming means is based on an N-point digital Fourier transform.

Generally, said spectrum filtering means is a processor which accepts an input array of spectral components and outputs only part of the input array.

Typically, said means for deriving said second set of products from said first set of products is a processor based on applying the operation of complex conjugation to said first set of products.

In accordance with the present invention said processor means for converting said first and second sets of products to said discrete time output signals is based on a pruned decimation-in-frequency structure fast Fourier transform.

If desired, said processor means for converting said first and second sets of products to said discrete time output signals can be followed by a further processors for scaling up said discrete time output signals in order to restore the scaling of said discrete time output signals to that of the input signal.

Also if desired, said further processors for scaling up said discrete time output signals can each be followed by a digital to analog processor in order to convert said discrete time signals having original scaling to continuous time output signals.

Typically, said digital to analog processor is followed by a transducer for transmitting said continuous time output signals to a neighboring medium.

By one specific application said transducer is an antenna and said continuous time output signals are electromagnetic signals.

By another specific application said transducer is associated with at least one of a microphone, a hydrophone, or a geophone and said continuous time output signals are acoustic signals.

Although the present invention has been described with a certain degree of particularity in what is believed to be the most practical and preferred embodiments, it is apparent that departures from specific methods and designs described and illustrated will suggest themselves to those skilled in the art and that various alterations and modifications may be made without departing from the spirit and scope of the invention as hereinafter claimed.

BRIEF DESCRIPTION OF THE DRAWINGS AND APPENDICES

For a better understanding the invention will now be described, by way of example only, with reference to the accompanying drawings and appendices in which.

Appendix A is a description of how the phase delay error $\phi_i(m,N)$ may be reduced by increasing the sampling rate $f_s$.

Appendix B is computer listing of a FORTRAN Program Implementing the Input and Output Pruned Decimation-in-Frequency FFT Algorithm.

DETAILED DESCRIPTION OF THE INVENTION

The description below focuses on the broadband digital frequency-domain implementation of linear one dimensional arrays. It should be noted, however, that it applies mutatis mutandis to arrays of general geometries and dimensions and to narrowband arrays.

Since the digital frequency-domain implementation of a broadband beamformer is basically a digitization of an analog frequency-domain broadband beamformer the description begins with a brief summary of the latter. This sets the notation for the analog quantities to be digitized and aids in understanding the main differences between the two implementations.

Figure 1:
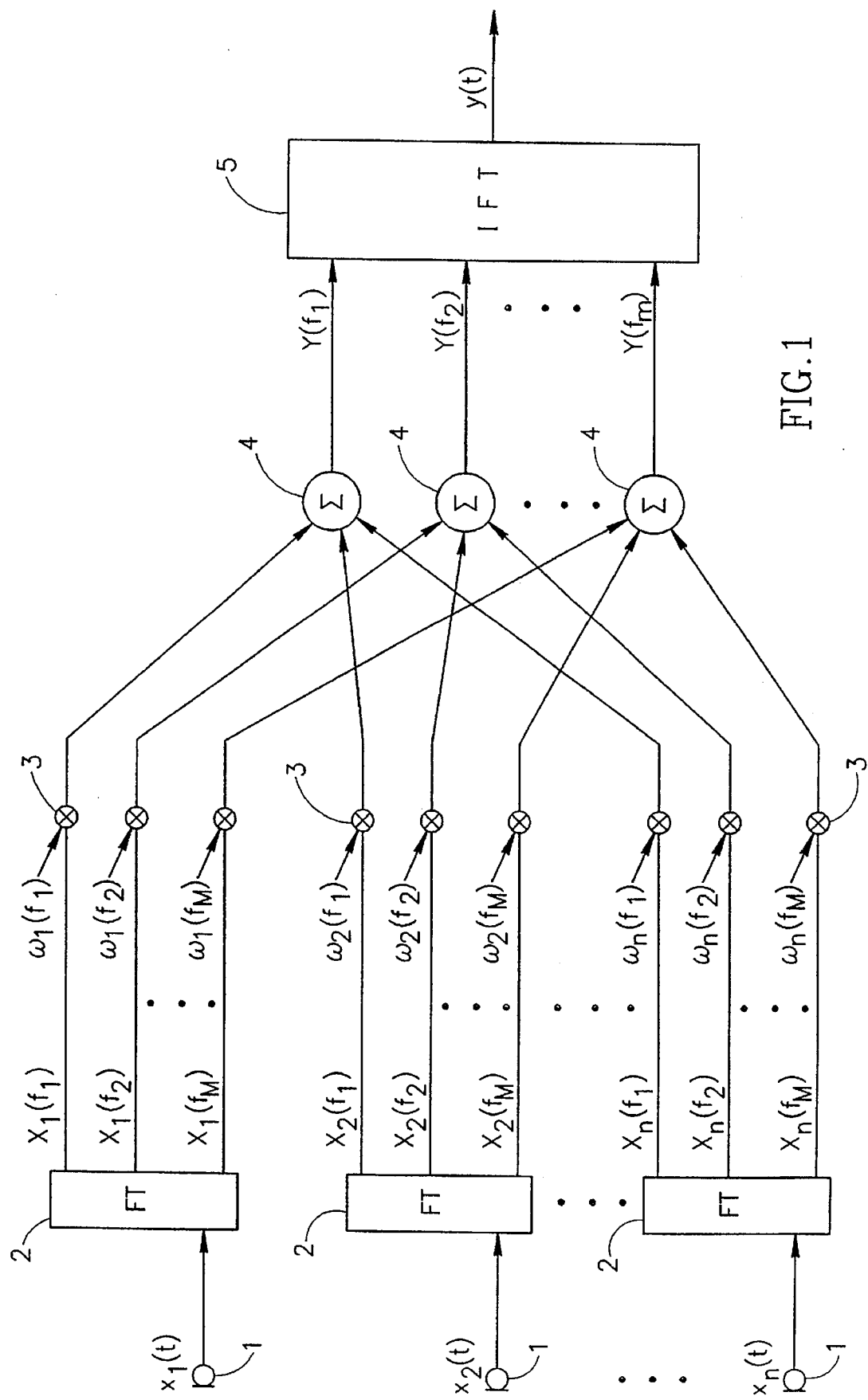
FIG. 1 is an illustrative block diagram of the implementation of an analog broadband frequency-domain beamformer.

Attention is first directed to FIG. 1, showing an illustrative block diagram of an analog frequency-domain implementation of a broadband beamformer. A continuous broadband signal x(t) is incident on a linear array of n sensors 1. The signal received by the $i^{th}$ sensor at time t is given by $x_i(t)$ (i=1, ..., n).

Essential to the implementation of beamformers is the choice of the array weights that determine the discriminating directional properties of the array. If weights are chosen, based on certain performance criteria (Monzingo and Miller, 1980, pp. 105–128), then the beamformer is said to be optimal. For the beamformer to be broadband the weights have to be broadband. These weights, $w_i(f)$ (i=1, ..., n), are complex numbers and are functions of frequency $f$. Furthermore, the weights may be either deterministic (fixed) or adaptive. For notational convenience the steering phase-delay units necessary for phase alignment in the desired direction are incorporated into the array weights. The weights can be expressed as follows:

$$w_i(f)=|w_i(f)| \exp (j \, arg[w_i(f)]), \quad (1)$$

where $j=\sqrt{-1}$.

In order to apply these optimum weights, the signal in each channel of the array is decomposed by a filterbank 2 (i.e., a set of processors that spectrally decompose the signal using the Fourier Transform (FT)) into a set of frequency bins (as is well known in the art a frequency bin represents the frequency band of each filter in the filter bank) along the whole frequency band of interest. The bandwidth of the frequency bin is chosen so that the complex weight selected appropriate for the center frequency is also appropriate for any other frequency within the bin.

The continuous Fourier transforms, or spectral components, of the signal received by the $i^{th}$ sensor, $x_i(t)$ (i=1, ..., n), are denoted by $X_i(f)$, ($f_1 \leq f \leq f_M$). Where $f_1$, ..., $f_M$ are the center frequencies for a set of M adjacent frequency bins along the whole of the frequency band of the incident broadband signal x(t). Each spectral component $X_i(f)$ is multiplied by a corresponding weight $w_i(f)$ by a multiplying unit 3 and the resulting products $w_i(f)X_i(f)$ are summed by summers 4 yielding the Fourier transform Y(f) of the continuous time beamforming output y(t) of the array:

$$Y(f) = \sum_{i=1}^{n} w_i(f) X_i(f) \qquad (2)$$

The beamforming output y(t) is obtained by applying an Inverse Fourier Transform (IFT) processor 5 to the Y(f)'s.

Eqs. (1) and (2) indicate that the Fourier transform of the beamforming output for a specific frequency component, Y(f), can be regarded as a summation of the sensor signals $X_i(f)$, each amplified by $|w_i(f)|$ and delayed by $\arg[w_i(f)]$. The sensor signals are assumed to be bandlimited, or are made so through anti-aliasing filtering.

Figure 2:
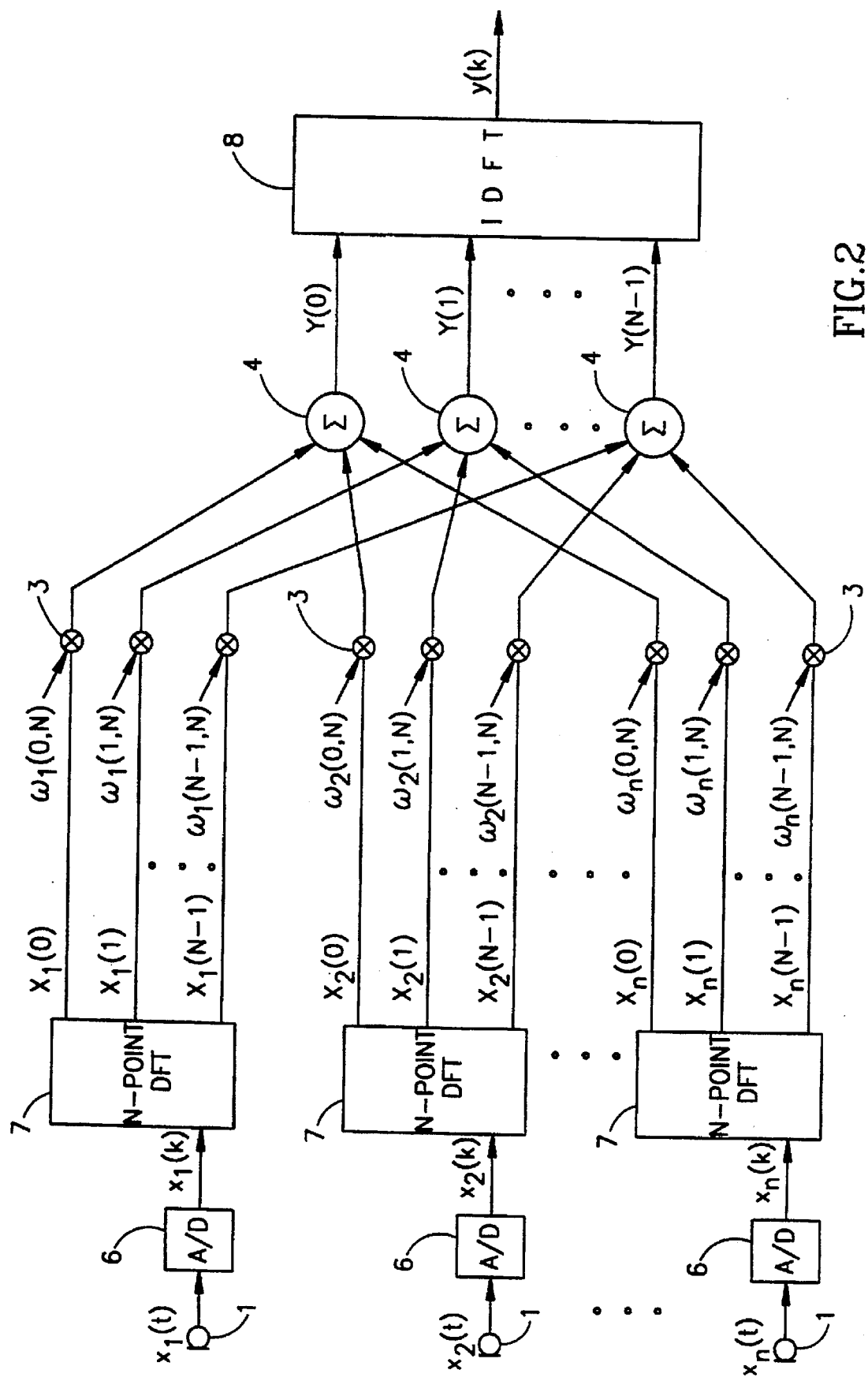
FIG. 2 is an illustrative block diagram of a straightforward implementation of a broadband digital frequency-domain beamformer.

Attention is now directed to FIG. 2, showing an illustrative block diagram of a straightforward digital frequency-domain implementation of an optimal broadband beamformer. As with the analog case, described above with reference to FIG. 1, a continuous broadband signal x(t) is incident on a linear array of n sensors 1, and the signal received by the $i^{th}$ sensor at time t is given by $x_i(t)$ (i=1, ..., n).

The continuous sensor signals are digitized by analog to digital convertors 6 by sampling the sensor signals at equal time intervals, with a sampling rate $f_s$ which satisfies the Nyquist sampling theorem. Each analog to digital convertor is typically preceded by an anti-aliasing filter, not shown. The digital version of the ith sensor signal $x_i(t)$ is denoted by $x_i(k)$ (k=0, ..., N−1). The digitized signals are spectrally decomposed by a filter bank 7 that is realized using a Discrete Fourier Transform (DFT) processor. The N-point discrete Fourier transform of $x_i(k)$ (in the following N, the number of points used in the DFT will also be referred to as the length of the DFT) is denoted by $X_i(m)$ (m=0, ..., N−1). Each digitized spectral component $X_i(m)$ is multiplied by a corresponding digitized weight $w_i(m,N)$ by a multiplying unit 3. The weight $w_i(m,N)$ represents an optimally chosen weight in the ith channel for the frequency (m/N)$f_s$. The resulting products are then summed by the summers 4 yielding the digital version of Eq. (2):

$$Y(m) = \sum_{i=1}^{n} w_i(m,N) X_i(m), \qquad (3)$$

where Y(m) is the digital frequency-domain beamforming output, whose inverse Fourier transform, denoted by y(k), is the discrete time beamforming output of the array. The beamforming output, y(k), is obtained by applying an Inverse Digital Frequency Transform (IDFT) processor 8 to the Y(m)'s.

Assuming, ideally, that the weights $w_i(m,N)$ in Eq. (3) can be applied in the beamforming procedure without introducing any errors, then Eq. (3) can be considered to be the exact digital form of Eq. (2), and therefore y(k) would represent the exact digital version of the ideal analog beamforming output y(t).

The straightforward digital frequency-domain optimal broadband beamformer as illustrated in FIG. 2 lacks both in efficiency and accuracy in its implementation. The present invention describes an efficient and accurate implementation of a digital frequency-domain optimal broadband beamformer. These properties are achieved by exploiting symmetry properties, by effectively increasing the sampling rate and by avoiding the computation of terms that do not contribute to the final output. The underlying theory behind the present invention is described in detail below.

The following symmetry relations exist, due to the fact that the input signals and the beamforming output are real numbers, (Oppenheim and Schafer 1989, p. 525):

$$X_i(m) = X_i^*(-m) \qquad (4)$$

and $$Y(m) = Y^*(-m), \qquad (5)$$

where the asterisk (*) denotes a complex conjugate. Substitution of Eq. (3) into Eq. (5) leads to $$\left[ \sum_{i=1}^{n} w_i(m,N) X_i(m) \right] = \left[ \sum_{i=1}^{n} w_i(-m,N) X_i(-m) \right]^* \qquad (6)$$

Then taking into consideration Eq. (4), it is found that the $w_i(m,N)$ have to satisfy the following conditions:

$$w_i(m,N) = w_i^*(-m,N) \qquad (7)$$

On the other hand, because of the periodicity property of the Fourier transforms $X_i(m)$ and Y(m), and in view of Eq. (3), the $w_i(m,N)$ should also satisfy $$w_i(m,N) = w_i(+N,N) \qquad (8)$$

Eqs. (7) and (8) then yield the relationship by which the $w_i(m,N)$ (m=N/2+1, ..., N−1) can be derived from the $w_i(m,N)$ (m=1, ..., N/2−1):

$$w_i(m,N) = w_i^*(N-m,N), \; m=N/2+1, ..., N-1. \qquad (9)$$

Since Eq. (9) also holds for $X_i(m)$ the N/2−1 values of $X_i(m)$ and $w_i(m,N)$ for m=N/2+, ..., N−1 are redundant in the beamforming operation, Eq. (3). As a consequence Eq.(3) need be performed for m =0, ..., N/2 only. The remaining values of Y(m), for m=N/2+1, ..., N−1, can be obtained through the operation of complex conjugation. Hence, following the N—point DFT by the filter bank 7 the redundant values of $X_i(m)$ (for m=N/2+1, ..., N−1, i=1, ..., n) can be removed, by spectrum filtering means, resulting in a saving of n(N/2−1) product operations by the multiplying units 3. By another embodiment, the filter bank 7 can be realized by an "output pruned fast Fourier transform" (Sreenivas and Rao (1979)), whose output $X_i(m)$ comprises the non-redundant spectral components only (i.e., m=0, ..., N/2; i=1, ..., n). In this case the spectrum filtering means is not required.

It is well known to those skilled in the art that when m is close to zero, deriving $w_i(m,N)$ may sometimes involve solving for the inverse of a singular matrix. In this case, the amplitude of $w_i(m,N)$ can be simply taken as 1/n, while its phase is determined by the look direction. In other words, for digital frequencies close to zero the optimum weights reduce to the conventional delay-and-sum beamforming weights.

The problem of reducing errors that arise in the digital frequency-domain implementation of arrays will now be discussed. Two types of errors arise in the digital frequency-domain implementation of arrays, quantization and digitization errors. Quantization errors can be overcome by using high precision floating-point operations. The higher the precision the smaller the error. Digitization errors give rise to time shift errors or, equivalently, phase delay errors. Phase delay errors play a significant role in determining the accuracy of the digital-frequency implementation of arrays. These errors can be reduced by time interpolation as will be described in detail below.

It is noted that if the complex weight $w_i(m,N)$ appearing in Eq. (3) is represented as:

$$w_i(m,N)=|w_i(m,N)| \exp(j \arg[w_i(m,N)]), \quad (10)$$

then the term $w_i(m,N)X_i(m)$ in Eq. (3) can be viewed as the mth frequency component $X_i(m)$ in the ith channel being amplified $|w_i(m,N)|$ times in amplitude, and delayed by $\arg[w_i(m,N)]$ in phase or, equivalently, by $\arg[w_i(m,N)]N/(2\pi m f_s)$ in continuous time. Since the time shift value due to DFT is actually given by $R[\arg[w_i(m,N)]N/(2\pi m)]/f_s$, where R[.] denotes rounding operation, the time shift error is given by:

$$\epsilon_t(i,m,N,f_s)=\arg[w_i(m,N)]N/(2\pi m f_s)- R[\arg[w_i(m,N)]N/(2\pi m)]/f_s, \quad (11)$$

and the time shift error represented in the unit of sample interval $1/f_s$ is $$\epsilon(i,m,N)=\arg[w_i(m,N)]N/(2\pi m)-R[\arg[w_i(m,N)]N/(2\pi m)]. \quad (12)$$

Obviously, $$-0.5<\epsilon(i,m,N)<0.5. \quad (13)$$

Correspondingly, Eq. (10) may be written as $$w_i(m,N)=|w_i(m,N)| \exp(j(\arg_N[w_i(m,N)]+\phi_i(m,N))), \quad (14)$$

where $$\arg_N[w_i(m,N)] = \frac{2\pi m}{N} R[\arg[w_i(m,N)]N/(2\pi m)] \quad (15)$$

$$\phi_i(m,N) = \frac{2\pi m}{N} \epsilon(i,m,N) \quad (16)$$

are, respectively, the actual physical phase delay and the corresponding phase delay error due to DFT. Hence, when digital sampling is used, Eq. (14) is reduced to $$\tilde{w}_i(m,N)=|w_i(m,N)| \exp(j \arg_N[w_i(m,N)]), \quad (17)$$

where the tilde (~) indicates an approximation.

Eq. (11) clearly indicates that the time shift error $\epsilon_t(i,m,N,f_s)$ is inversely proportional to the sampling rate $f_s$. Thus, increasing the sensor channel sampling rate is a straightforward approach to reducing the time shift error. However, increasing the sampling rate increases the requirements on system storage demands and on processing time (Pridham and Mucci, 1978). This problem is overcome in the present invention by a "time interpolation through DFT" approach which gives high precision time shifting without increasing the sensor channel sampling rate.

The time-domain interpolation method requires that the temporal DFT length be constant. Thus, increasing the sampling rate $f_s$ entails an increase in the DFT points N by the same factor. Consequently, as is demonstrated in Appendix A, the phase delay error $\phi_i(m,N)$ in Eq. (16) may be reduced by increasing the sampling rate $f_s$. The time domain interpolation will increase the sampling rate $f_s$ by a factor a (an integer power of 2) if $(\alpha-1)N$ zeros are added in the frequency domain between the old and the new folding frequencies (Prasad and Satyanarayana, 1986; Fraser, 1989). Thus, the frequency-domain beamforming output Y'(m) is derived by interpolating the $X_i(m)$'s (by zero padding), followed by the beamforming operation of applying the weights $\tilde{w}_i(m,\alpha N)$ and summing over all channels. Since the padded zeros do not contribute to the beamforming process, the computation can be simplified by performing the zero padding after the frequency-domain beamforming. Thus Y'(m) is derived as follows:

$$Y'(m)=\begin{cases} \tilde{Y}(m) & m=0,\ldots,N/2-1 \\ 0.5\tilde{Y}(m) & m=N/2 \\ 0 & m=N/2+1,\ldots,\alpha N/2 \\ [Y'(\alpha N-m)]^* & m=\alpha N/2+1,\ldots,\alpha N-1 \end{cases} \quad (18)$$

where the asterisk (*) denotes complex conjugation and $$\tilde{Y}(m)=\sum_{i=1}^{n} \tilde{w}_i(m,\alpha N)X_i(m) \; m=0,\ldots,N/2 \quad (19)$$

$$\tilde{w}_i(m,\alpha N) = |w_i(m,N)|\exp(j\arg_{\alpha N}[w_i(m,N)]), \quad (20)$$

$$\arg_{\alpha N}[w_i(m,N)] = \frac{2\pi m}{\alpha N} R\left[\arg[w_i(m,N)]\frac{\alpha N}{2\pi m}\right]. \quad (21)$$

Since the values of Y'(m) for $m=N/2+1,\ldots,\alpha N/2$ correspond to the padded zeros, only the values of $Y\alpha(m)$ for $m=0,\ldots,N/2$ need to be derived in the beamforming operation in Eq. (19). The non-zero padded elements of the second half of the spectrum, i.e. the values of Y'(m) for $m-\alpha N/2+1,\ldots,\alpha N-1$ are obtained through conjugate symmetry from the first half of the spectrum as prescribed by Eq. (18). The rational for the choice Y'(m)=0.5Y(m) (m=N/2) is given by Fraser (1989) and will not be discussed here. Consequently, the time-domain beamforming output y"(k) $(k=0,\ldots,\alpha N-1)$ obtained by using the zero padding interpolation is derived from the inverse transform of Y'(m).

Increasing the sampling rate $f_s$ by a factor $\alpha$ equivalently subdivides each sample interval into $\alpha$ subintervals. Hence, the time shifted value of the mth frequency component $X_i(m)$ will be increased in precision from an order of $1/(2f_s)$ to $1/(2\alpha f_s)$ due to multiplication by $\exp(j \arg[w_i(m,\alpha N)])$.

Restoration of the beamforming output to the original sampling rate $f_s$, is obtained by decimating y"(k) $(k=0,\ldots,\alpha N-1)$, retaining only every $\alpha$th sample of y"(k). Hence the beamforming output at the original sampling rate is given by y'(k)=y"($\alpha$k), $k=0,\ldots,N-1$ (Schafer and Rabiner, 1973). The result is multiplied by a since it was scaled down a times during the interpolation process. Thus, $$\hat{y}(k)=\alpha y'(k), k=0,\ldots,N-1. \quad (22)$$

By utilizing the weights given in Eq. (20) instead of those given in Eq. (17) the output $\hat{y}(k)$ is closer to the ideal digital beamforming output y(k), hence increasing the precision of the beamforming process. Eq.(22) will not incur aliasing due to the assumption that the signals are bandlimited and the original sampling rate $f_s$ satisfies the Nyquist sampling theorem.

The major disadvantage of the "time interpolation by DFT" method proposed here is the apparent large increase in the computation time required for the IDFT in computing y'(k) from Y'(m). If the IDFT is computed with the interpolation FFT algorithm, then $(\alpha N/2)\log_2(\alpha N)$ complex multiplications and $(\alpha N)\log_2(\alpha N)$ complex additions are required instead of the $(N/2)\log_2 N$ complex multiplication and $N\log_2 N$ complex additions. The heavy computational load may, however, be lightened by pruning the FFT, i.e., eliminating operations that do not contribute to the output, as first proposed by Markel (1971) and later developed by others (Skinner 1976; Sreenivas and Rao 1979; Nagai, 1986). Careful inspection of Eq. (18) reveals that a fraction $(\alpha-1)/\alpha$ of the values of Y'(m) are the padded zeros; thus, in computing y'(k) there are superfluous operations of multiplication by zero which may be eliminated. Furthermore, Eq. (22) indicates that only one of every $\alpha$ values of the computed IDFT contributes to the final result. Consequently, those operational paths which lead only to the fraction $(\alpha-1)/\alpha$ of unnecessary outputs may also be pruned. Based on this analysis, an efficient "input and output Pruned Decimation-in-frequency structure FFT algorithm (PDF)" is developed specifically for the computation of y'(k) by applying the inverse PDF to the frequency-domain beamforming output Y'(m), as described below.

Figure 3:
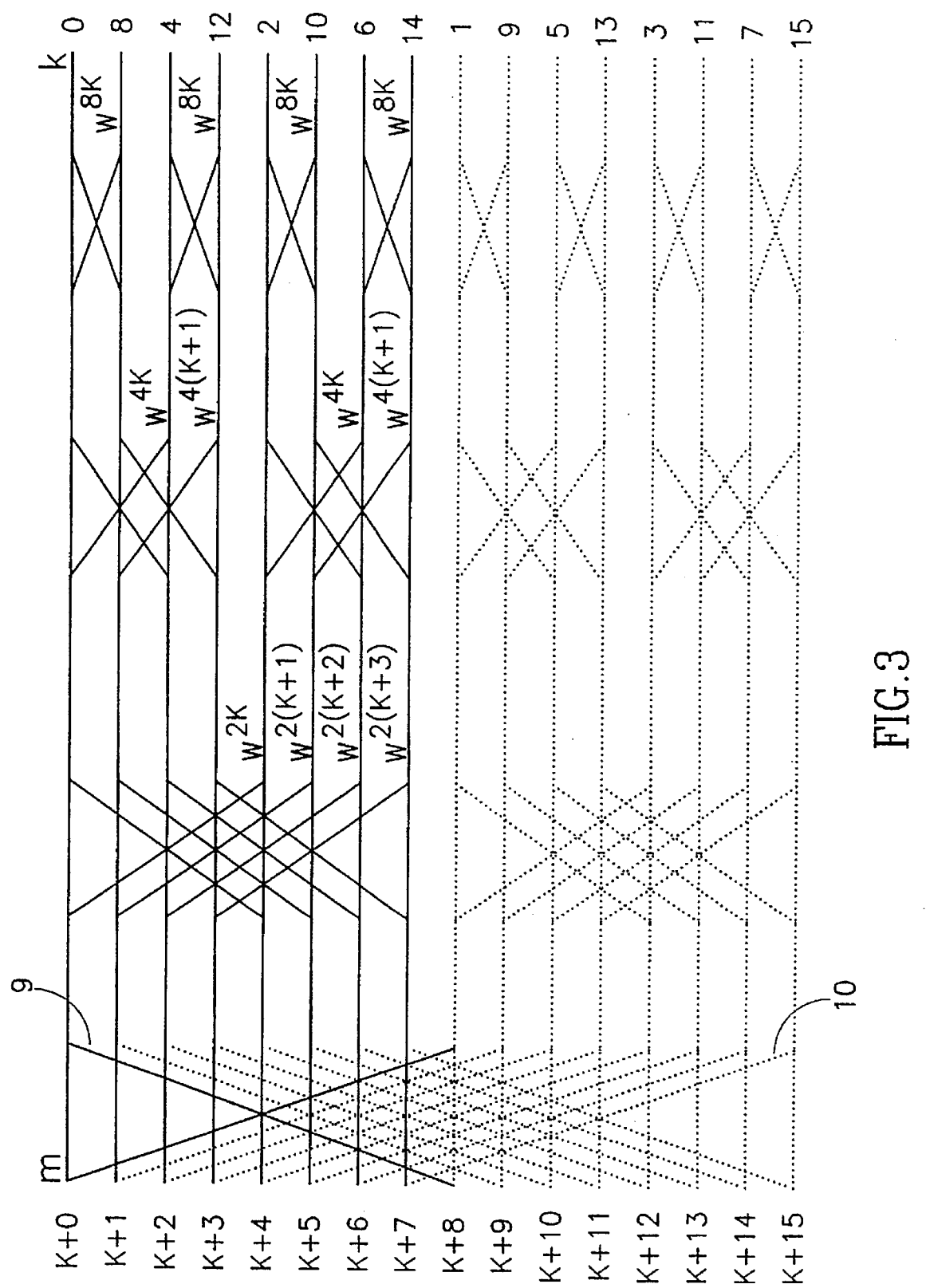
FIG. 3 is a flow graph of the input and output pruned decimation-in-frequency FFT algorithm for N=8, $\alpha$=2 with input shifted by K=12.

Attention is now drawn to FIG. 3 which shows the flow graph of the complete decimation-in-frequency algorithm for a 16-point FFT computation for the case in which N=8 and $\alpha=2$. In the figure $W=e^{-j(2\pi/N)}$ which, as is well known in the art, is used to express the DFT. The left hand column shows the values of the digital frequency m and the right hand column the values of the digital time k. The complete FFT algorithm is illustrated by the broken lines 9 and the pruning algorithm by the solid lines 10. In order to simplify the application of the pruning algorithm, the frequency shifting suggested by Nagai (1986) is used on the input. This means that Y'(m) is shifted by $K=\alpha N-N/2$ so that the zeros padded in the middle of the sequence are moved to the end due to the cyclic property of Y'(m) and therefore the desired N output data are located at the uppermost part of the whole output data, although in a bit-reversed order.

Figure 4:
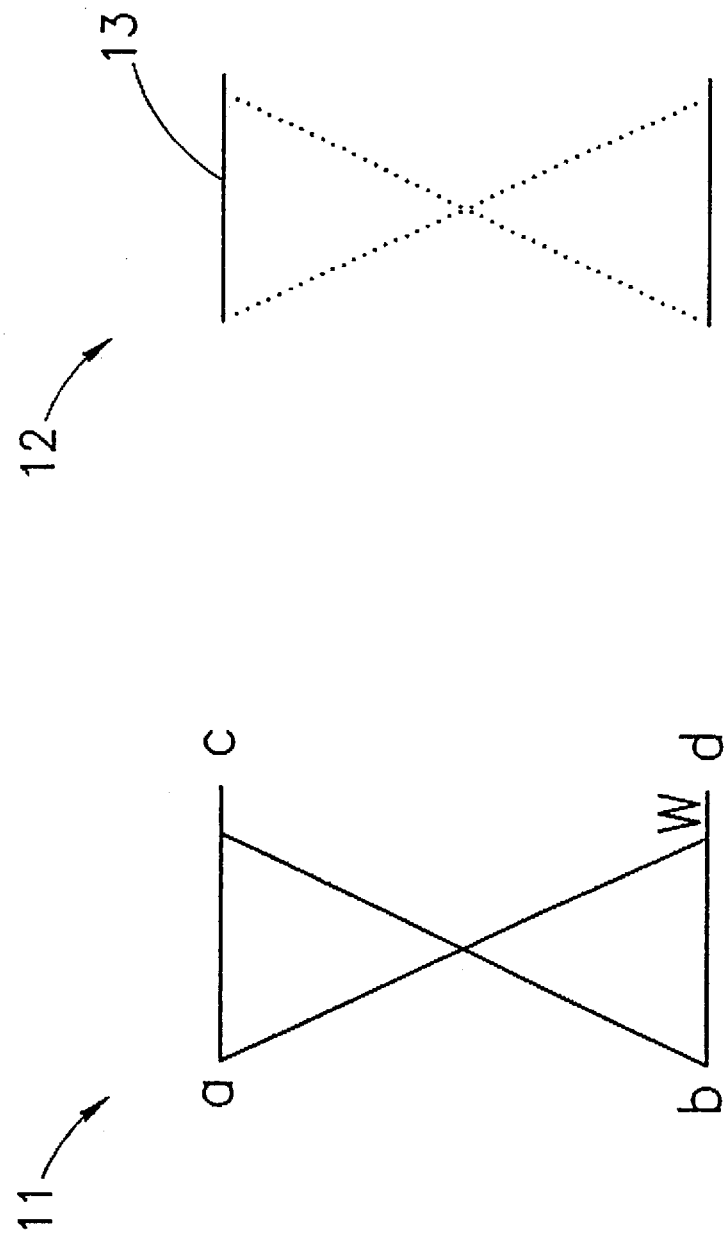
FIG. 4 shows complete and partial butterflies in the input and output pruned decimation-in-frequency FFT algorithm.

Attention is now drawn to FIG. 4 showing "butterflies" that are formed by the trellis structure of the lines in FIG. 3. The input values to the butterflies are a (the upper input) and b (the lower input) and the output values are c=a+b and d=(a−b)W. The butterflies are classified as being either complete 11 if all the lines are solid, or incomplete 12 if only some of the lines are solid. Only those butterflies that are complete and that contribute to the output are calculated in the algorithm. The computation of those butterflies whose contribution to the output is their upper input 13 is reduced to the operation of merely transferring the upper input directly to the next stage. Thus, complex multiplication and addition in those butterflies can be spared. If it is assumed, for the sake of clarity, that the number of input data is $\alpha N=2^M$, and that the number of output data is $N=2^L$, then from FIG. 3 it can be seen that the computation for the first (M-L) stages is just a transfer of the upper input of each butterfly to the next stage; whilst computation for the last L stages is just a computation of each complete butterfly, just like the conventional $N=2^L$ point FFT. Clearly, the application of time interpolation by FFT, as proposed in the foregoing, adds almost no extra computational burden. Since the decimation-in-time structure is essentially a mirror image of the decimation-in-frequency structure, the inverse discrete Fourier transform by the above "input and output pruned decimation-in-frequency structure FFT algorithm" can also be performed by an equivalent "input and output pruned decimation-in-time structure FFT algorithm" (Sreenivas and Rao, 1979).

Figure 5A:
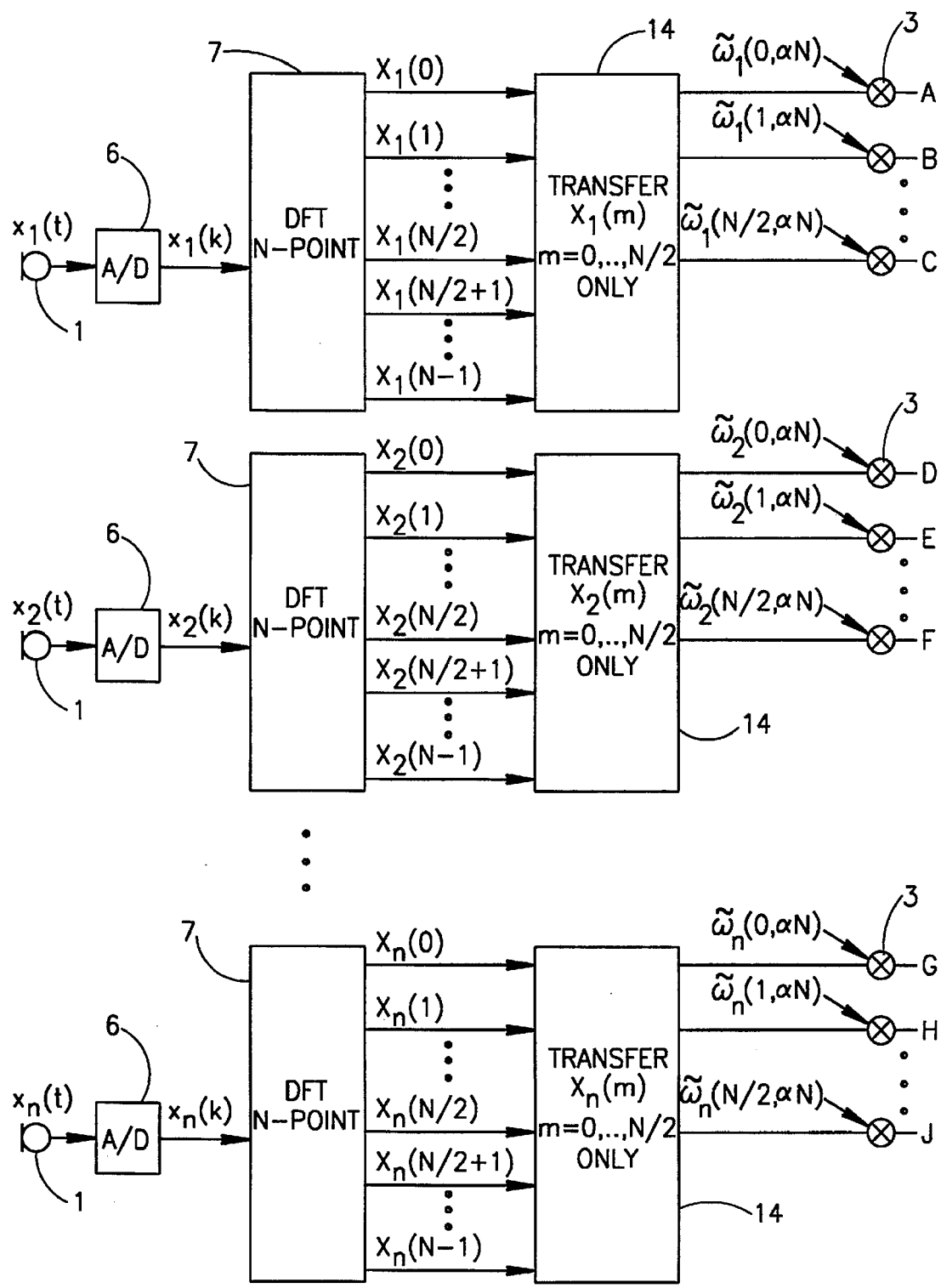
FIGS. 5A–5B are an illustrative block diagram of the implementation of a receiving optimum broadband digital frequency-domain beamformer according to a preferred embodiment of the present invention.
Figure 5B:
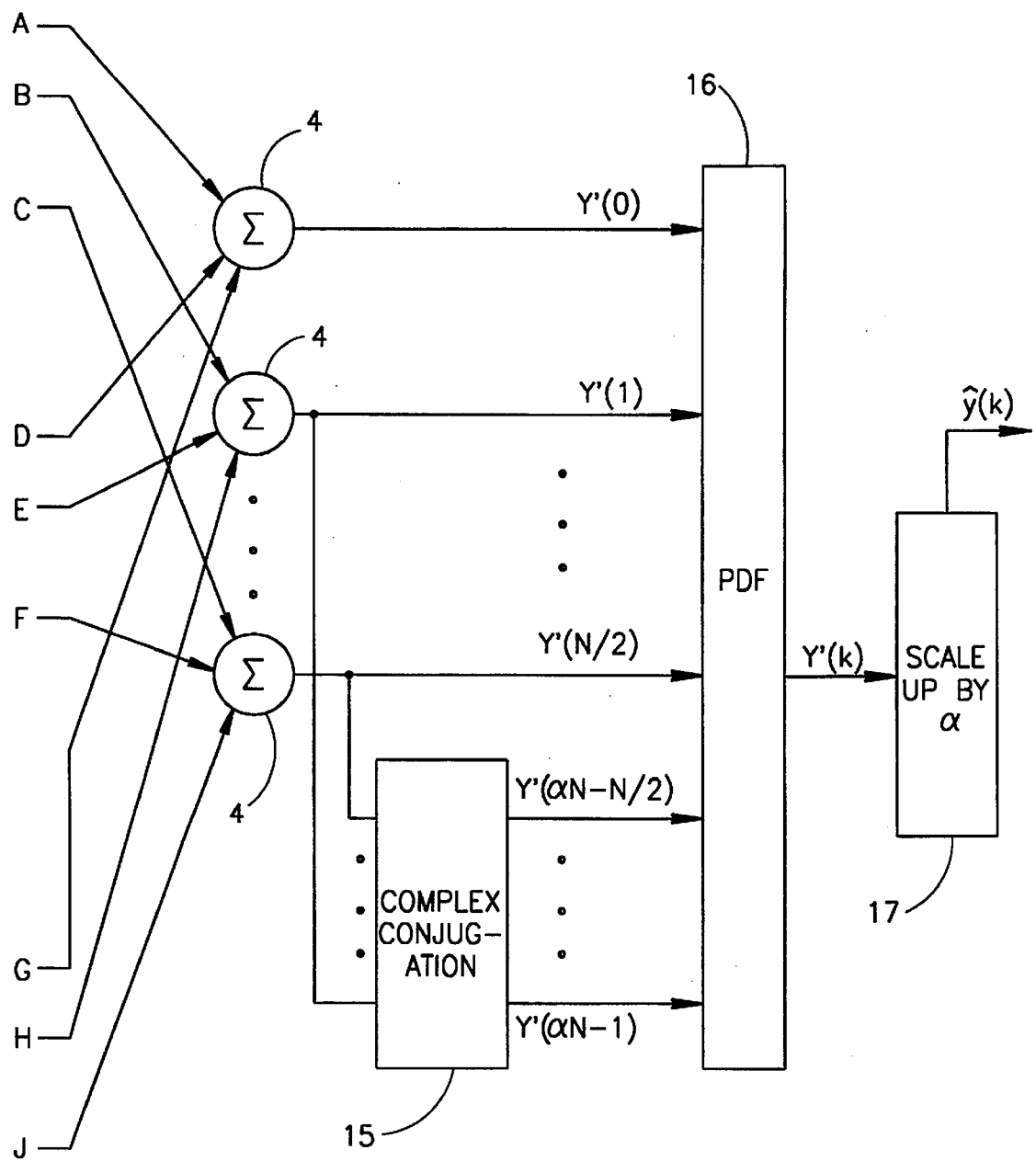

Attention is now drawn to FIGS. 5A and 5B illustrating the implementation of a receiving optimum broadband digital frequency-domain beamformer according to a preferred embodiment of the present invention which is based on "interpolation by FFT" and the "input and output Pruned Decimation-in-frequency structure FFT algorithm" for achieving an efficient and accurate implementation of a digital frequency domain broadband beamformer.

As with the straightforward approach illustrated in FIG. 2 a continuous broadband signal x(t) is incident on a linear array of n sensors 1, and the signal received by the $i^{th}$ sensor at time t is given by $x_i(t)$ (i=1, ..., n).

The sensor signals are digitized by analog to digital convertors 6 by sampling the sensor signals at equal time intervals, with a sampling rate $f_s$ which satisfies the Nyquist sampling theorem. Each analog to digital convertor is typically preceded by an anti-aliasing filter, not shown. The digital version of the ith sensor signal $x_i(t)$ is denoted by $x_i(k)$ (k=0, ..., N−1). The digitized signals are spectrally decomposed by a filter bank 7 that is realized using a Discrete Fourier Transform (DFT) processor. The N-point discrete Fourier transform of $x_i(k)$ is as above denoted by $X_i(m)$ (m=0, ..., N−1). As described in the foregoing, time domain interpolation will increase the sampling rate $f_s$ by a factor $\alpha$ (an integer power of 2) if $(\alpha-1)N$ zeros are added in the frequency domain between the old and the new folding frequencies, however, since the padded zeros do not contribute to the beamforming process, the computation can be simplified by performing the zero padding after the frequency-domain beamforming. Hence, the redundant values of $X_i(m)$ (for m=N/2+1, ..., N−1, i=1, ..., n) are first removed, by spectrum filtering means 14 and the remaining non-redundant values of $X_i(m)$ (for m=0, ..., N/2, i=1, ..., n) are multiplied the scaled set of optimum weights $\tilde{w}_i(m,\alpha N)$ (scaled in both amplitude and phase so as to correspond to $\alpha N$ spectral components, where a is an integer power of 2, whereby effectively increasing the sampling rate of the input signal by a factor of $\alpha$) by a multiplying unit 3. The resulting products are then summed by the summers 4, yielding the spectral components of the beamforming process, Y'(m), for the frequency components m=0, ..., N/2. The spectral components of the beamforming process, Y'(m), for the frequency components $m=\alpha N-N/2, \ldots, \alpha N-1$ are now obtained through complex conjugation, by the complex conjugate processor 15 which is realized through the following prescription for computing Y'(m):

$$Y'(m) = \begin{cases} 0.5[\tilde{Y}(\alpha N - m)]^* & m = \alpha N - N/2 \\ [\tilde{Y}(\alpha N - m)]^* & m = \alpha N - N/2 + 1, \ldots, \alpha N - 1 \end{cases} \quad (23)$$

It should be noted that only the non-zero components of Y'(m) are computed in Eq. (23). That is, the values of Y'(m) for m=N/2+1, ..., $\alpha N-N/2-1$, corresponding to the padded zeros, are not computed. Although the inverse DFT, for computing the digital time domain output, requires a complete set of spectral components the PDF processor 16, based on a pruned decimation-in-frequency structure fast Fourier transform, is so designed so as to not require the input of padded zeros as described in greater detail below. Finally, the time domain output, y'(k), is scaled up by the scaling unit 17, in order to restore the beamforming output to the original scaling.

Figure 6A:
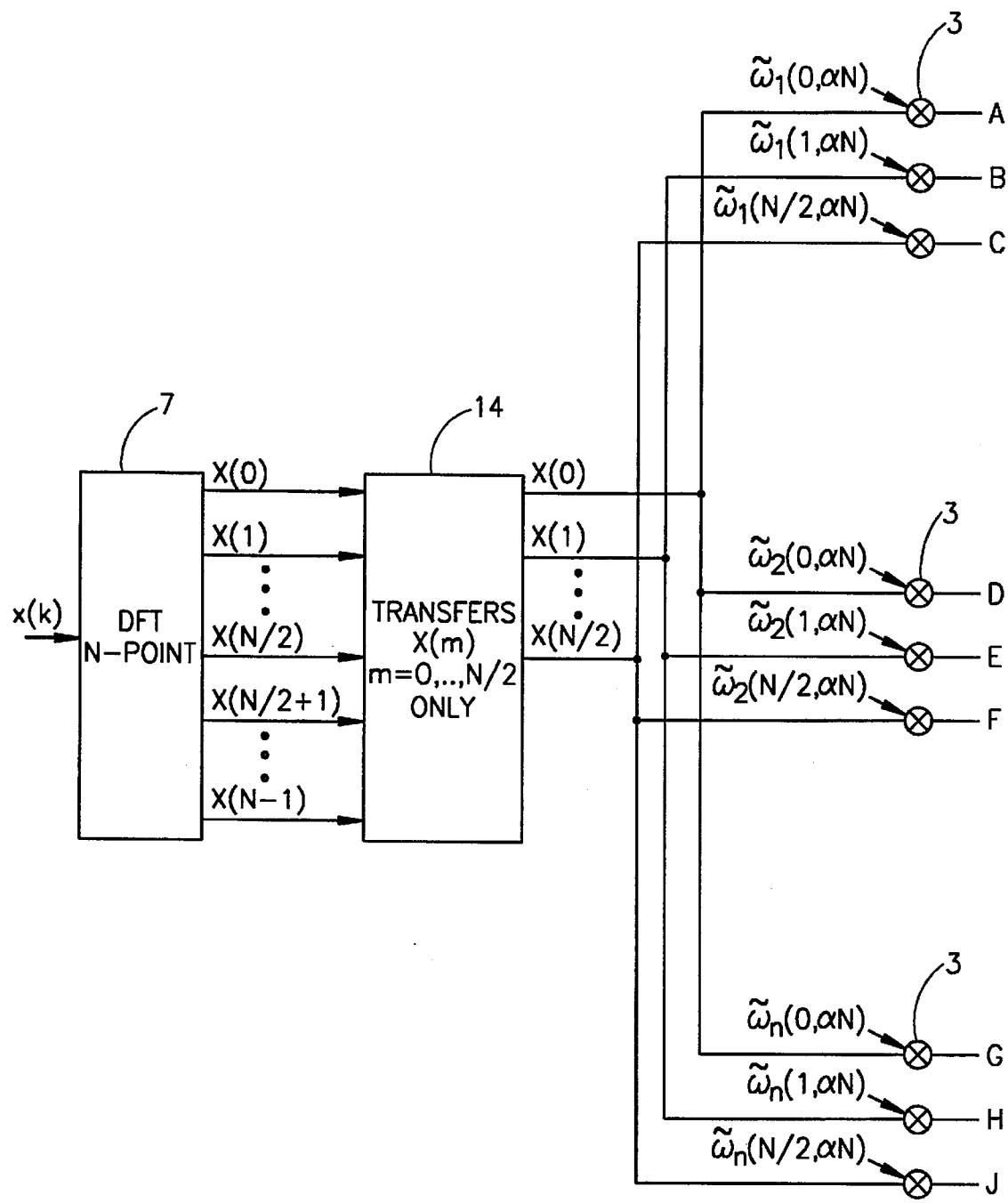
FIGS. 6A–6B are an illustrative block diagram of the implementation of a transmitting optimum broadband digital frequency-domain beamformer according to a preferred embodiment of the present invention.
Figure 6B:
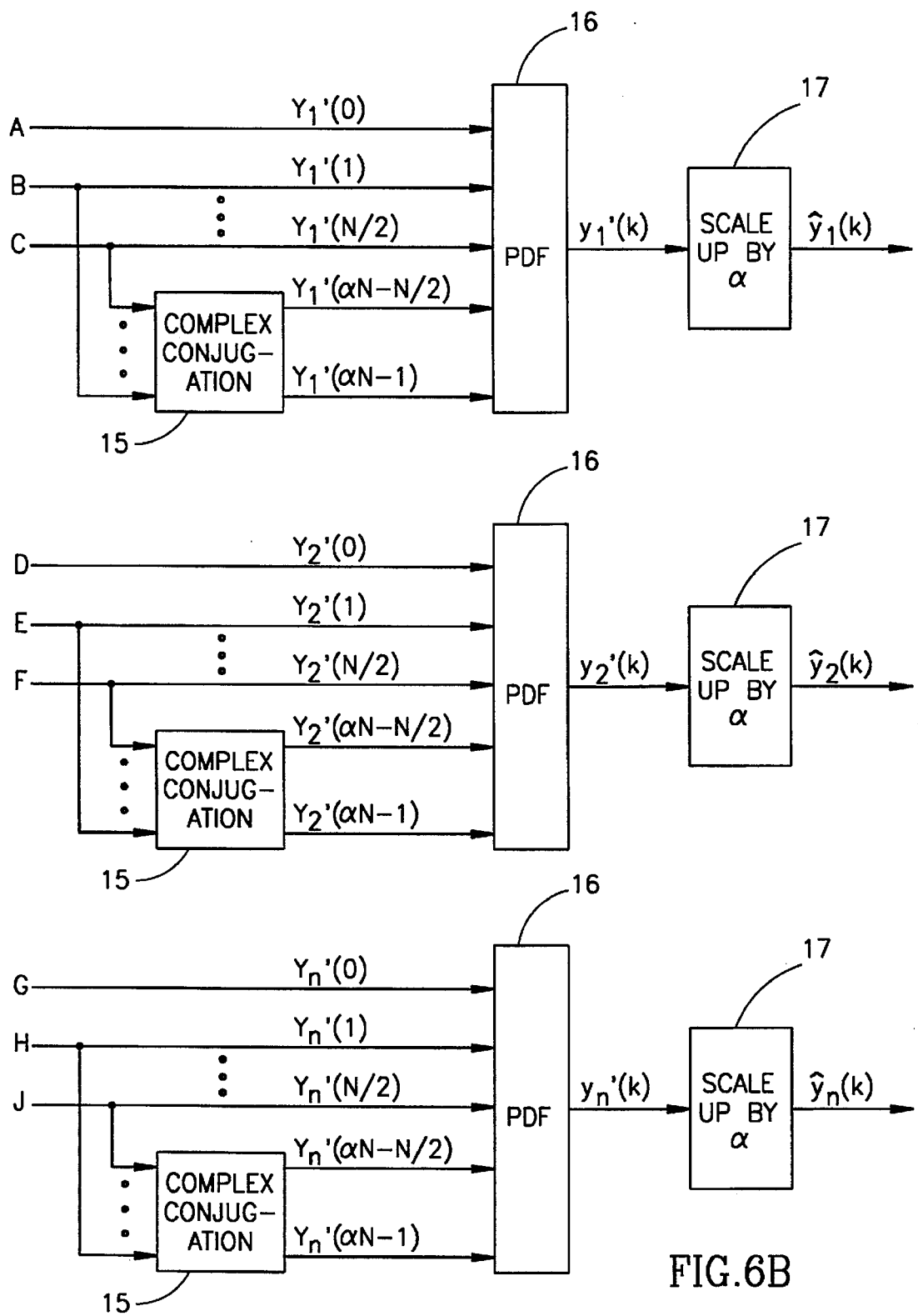

Attention is now drawn to FIGS. 6A and 6B illustrating the implementation of a transmitting optimum broadband digital frequency-domain beamformer according to a preferred embodiment of the present invention which, as in the case of the receiving array, is based on "interpolation by FFT" and the "input and output Pruned Decimation-in-frequency structure FFT algorithm" for achieving an efficient an accurate implementation of a digital frequency domain broadband beamformer. Therefore, its operation will not be described in great detail. It is important to note that for convenience the notation used in FIGS. 6A and 6B is similar to that used in FIGS. 5A and 5B, however, the various signals, spectral components and weights take on completely different values in the two sets of figures.

The input to the system is a broadband digital time domain signal x(k), which invariably is obtained from a continuous broadband signal x(t) digitized by an analog to digital convertor, not shown. The analog to digital convertor is typically preceded by an anti-aliasing filter. The digital signal is spectrally decomposed by a filter bank 7 that is realized using a Discrete Fourier Transform (DFT) processor. The N-point discrete Fourier transform of x(k) is denoted by X(m) (m=0, ..., N-1). The redundant values of X(m) (for m=N/2+1, ..., N-1) are removed, by the spectrum filtering means 14 and the remaining non-redundant values of X(m) (for m=0, ..., N/2,) are multiplied a scaled set of optimum weights $\tilde{w}_i(m,\alpha N)$ (scaled in both amplitude and phase so as to correspond to $\alpha N$ spectral components) by multiplying units 3, for each channel i (i=1, ..., n) of the array, yielding the spectral components of the beamforming process, $Y_i'(m)$, for the frequency components m=0, ..., N/2 and for each channel i=1, ..., n, of the array. The spectral components of the beamforming process, for the frequency components m=$\alpha$N-N/2, ..., $\alpha$N-1 are obtained through complex conjugation, by the complex conjugate processors 15 which are realized through Eq. 23, as described above, and the resulting spectral components of the beamforming process, $Y_i'(m)$, for the frequency components m=0, ..., N/2 and m=$\alpha$N-N/2, ..., $\alpha$N-1 are fed into the PDF processors 16, for each channel i=1, ..., n, of the array. Finally, the digital time domain outputs, $y_i'(k)$ (k=0, ..., N-1, i=1, ..., n), of the PDF processors are scaled up by the scaling units 17, in order to restore the beamforming output to the original scaling. The outputs of the units 17 are given by $\hat{y}_i(k)=\alpha y_i'(k)$. If required the digital time output signals $\hat{y}_i(k)$ can be converted to continuous time domain signals by appending to each unit 17 a digital to analog converter.

Attention is now directed to Appendix B showing the listing of a FORTRAN program implementing the "input and output pruned decimation-in-frequency structured FFT algorithm". It is on this program that the operation of the PDF processor is based. This program requires that the frequency-shifted data, i.e., the section of padded zeros, be moved to the end of the sequence. In fact, as is noted from FIG. 4, no operations are carried out on those processor storage units which contain the padded zeros, i.e., those labelled K+9 through K+15. This means that the zeros in Eq. (18) do not have to be padded. Therefore, $\alpha$N-N-1 storage units may be saved yielding a required storage space has N+1 units for the present algorithm (the storage units from K+0 through K+8, in FIG. 4) which is comparable to the storage space required for a conventional N-point FFT algorithm. The output data of the computation is actually sorted in a bit-reversed order. The bit-reversed sorting method given by Oppenheim and Schafer (1989, p. 610) is used at the end of the program to restore the output data to the normal order. It should be noted that in the FORTRAN program listed in Appendix B, the dimension of the array ZR, for storing the input and output data, is set to 1025 for a 1024-point FFT application. In general, for an N-point FFT application the dimension of the array ZR should be set to N+1.

The interpolation by DFT introduced in the foregoing is theoretically a perfect interpolation method which will not introduce any errors. In practice, however, apart from the errors described above, an error similar to the Gibbs phenomenon (Oppenheim and Schafer, 1989, pp. 49 and 446) is introduced by the aliased spectral leakage that results from the finite length of the DFT. Fraser (1989) suggested two ways of reducing the leakage: by increasing the length of the DFT or by applying windows (for a description of the use of windows in the implementation of the Fourier transform, or DFT, see—Oppenheim and Schafer, 1989, pp. 447–449, 697–718 and 724–727).

Increasing the length of the DFT results in an undesirable increase in processing time. However, in many applications, the length of the DFT chosen on the rational discussed in the foregoing, is already sufficiently long; Fraser (1989) has experimentally demonstrated that a DFT length of 512 points would result in interpolation with an accuracy better than the quantization level for 8 bits. Applying windows, on the other hand, does not necessarily present an extra burden to the processing time. The experimental results of Fraser (1989) show that even limited end windowing might result in significant improvement in interpolation accuracy. However, if a short term Fourier technique is used, in order to avoid confusion between different temporal sections of the received signal during the execution of the DFT (Allen anti Rabiner 1977), the algorithm should be modified by discarding the end fractions of the short term sequence, which are regions of high errors.

Although developed for low-pass signals, the present invention may also be applied to bandpass signals by using band shifting (Van Trees 1968, p. 581; Pridham and Mucci 1979). It is also applicable for achieving high precision digital phase shifts in the narrowband applications (Pridham and Mucci 1978; Mucci 1984), provided the optimum weights in Eqs. (20) and (21) are replaced by $$\tilde{w}_i(m_0,\alpha N)=|w_i| \exp(j\, arg_{\alpha N}[w_i(m_0)]) \quad (24)$$

and $$arg_{\alpha N}[w_i(m_0)] = -\frac{2\pi m_0}{\alpha N} R[\tau_i(\theta_p)\cdot \alpha f_s], \quad (25)$$

respectively, where $m_o$ is the center frequency of the narrowband signal incident on the array, $|w_i|$ denotes the narrowband beamforming weight for the ith channel, $\tau_i(\theta_p)$ denotes the time delay required for the ith channel to steer the beam in the direction $\theta_p$, and $R[\tau_i(\theta_p)\alpha f_s]$ is the time delay (measured in the number of sample points) actually performed for the sampling rate $\alpha f_s$. Clearly then, the beam steering resolution can be improved by increasing the sampling rate.

In the foregoing all that has been described is how to improve the precision of the beamforming output by increasing the value of N through interpolation. The problem of actually choosing the value of N is now discussed. The value of N determines the frequency resolution and should be selected based on the variation of the beam pattern with frequency. Thus, N should be taken large enough to ensure that each frequency is weighted by an appropriate weight so that the beams and nulls of the array are maintained in the same directions for all frequencies of interest. Note, however, that the DFT length N is not necessarily identical to the length of each section of the data taken for the DFT, which shall be denoted as $N_s$. The value for $N_s$ depends on the array size and signal bandwidth.

Mucci (1984) indicated that the maximum propagation delay across the array should be less than 10% of the duration, $N_s/f_s$, for transforming the data, in order to avoid the possibility that the DFT in each channel will operate on different temporal regions of the received signal. Therefore, a large array would require a large memory allocation for the DFT processing. However, since the signals in radar, sonar, seismology, communications and most other applications are generally nonstationary, short term Fourier techniques (Allen and Rabiner 1977) can be adopted in order to avoid confusion between different temporal sections of the received signal during the execution of the DFT. Since choosing the value of $N_s$ is also based on the duration of the quasi-steady sections of the signal, the method of frequency-domain beamforming proposed here may be limited, when the signal is nonstationary, to arrays of relatively small size.

In the event that $N_s$ is shorter than the required DFT length N, an appropriate zero padding in the time domain may be needed. In addition, zero padding in the time domain is also needed in order to implement the FFT algorithm in cases where the length of the DFT is not an integer power of 2. Since calculations on these time domain padded zeros are redundant, the filter bank 7 can be realized by an "input and output pruned fast Fourier transform" detailed by Sreenivas and Rao (1979), so as to save both the calculations on the redundant input padded zeros and the calculations for the redundant output values of $X_i(m)$ (for $m=N/2+1, \ldots, N-1$; $i=1, \ldots, n$). However, increasing the DFT length for a high precision implementation of the optimum broadband weights would still increase the processing time and data storage requirements. Therefore, the values of $N_s$ and the DFT length N should be chosen with care.

APPENDIX A

If we express the time shift error $\epsilon(i,m,N)$ in Eqs. (12) and (13) for sampling rate $f_s$ in a base-$\alpha$ number system, then $$\epsilon(i,m,N) = \frac{A_1}{\alpha} + \frac{A_2}{\alpha^2} + \frac{A_3}{\alpha^3} + \ldots, \qquad (A1)$$

where $\alpha>1$ is a positive integer and $A_j$ ($j=1,2, \ldots$), which are also integers, satisfy either the condition $0<A_j<\alpha^j$ ($j=1,2, \ldots$) or $-\alpha^j<A_j\leq 0$ ($j=1,2, \ldots$), depending on the algebraic sign of $\epsilon(i,m,N)$. By substituting Eq. (A1) into Eq. (16), we obtain the phase delay error $\phi_i(m,N)$ for sampling rate $f_s$ $$\phi_i(m,N) = \frac{2\pi m}{N} \sum_{j=1}^{\infty} \frac{A_j}{\alpha^j}. \qquad (A2)$$

When the sampling rate is increased to $\alpha f_s$ with the temporal length of DFT unchanged, i.e., the DFT points are correspondingly increased to $\alpha N$, Eqs. (12) and (A1) yield the new time shift error $$\epsilon(i,m,\alpha N) = \frac{A_2}{\alpha} + \frac{A_3}{\alpha^2} + \ldots, \qquad (A3)$$

and the new phase delay error $\phi_i(m,\alpha N)$ becomes $$\phi_i(m,\alpha N) = \frac{2\pi m}{\alpha N} \sum_{j=2}^{\infty} \frac{A_j}{\alpha^{j-1}}. \qquad (A4)$$

Consequently, the ratio between the absolute values of the two phase delay errors $\phi_i(m,\alpha N)$ and $\phi_i(m,N)$ is given by $$\left| \frac{\phi_i(m,\alpha N)}{\phi_i(m,N)} \right| = \frac{1}{\left| \frac{A_1}{\epsilon(i,m,\alpha N)} \right| + 1} \leq 1. \qquad (A5)$$

It is apparent that as long as $A_1 \neq 0$, the phase delay error $\phi_i(m,N)$ will absolutely diminish as the number of DFT points N is increased with increasing the sampling rate $f_s$.

APPENDIX B

```
      SUBROUTINE PRNIFFT(M,ZR,NALEPH)
C
C     ****************************************************************
C  *  2**M         : TOTAL NUMBER OF FFT POINTS
C  *  ZR           : INPUT DATA (COMPLEX) (SHIFTED), AND OUTPUT
C  *                 DATA (COMPLEX) (FIRST NA) (IN NORMAL ORDER)
C  *  NALEPH       : TIME INTERPOLATION COEFFICIENT
C     ****************************************************************
      COMPLEX ZR(1025),CDATA
      N=2**M                    ! TOTAL NUMBER OF FFT POINTS
      NA=N/NALEPH               ! TOTAL NUMBER OF OUTPUT DATA
      KINIT=N-NA/2              ! FREQUENCY SHIFT VALUE
      KBAND=NA+1                ! BANDWIDTH WITHOUT PADDED
C                                 ZEROS
      NREP=N*2                  ! INITIAL VALUE OF NREP
      ARGO=6.283185             ! 2*PAI (INVERSE TRANSFORM)
C
      DO 100 I=1,M              ! I: ORDER OF STAGES
      NREP=NREP/2               ! NUMBER OF BLOCK DATA IN A
C                                 BUNCH
      NBTF=NREP/2               ! NUMBER OF BUTTERFLIES IN THE
C                                 BUNCH
      ARG=ARGO/FLOAT(NREP)      ! BASE OF PHASE ANGLE
      LBTF=KBAND-NBTF           ! THE LOWEST REQUIRED AND
C                                 COMPLETE BUTTERFLIES
C
C     ====PRUNING UNNECESSARY BUTTERFLIES IN A BUNCH====
      DO 100 J=1,MINO(NBTF,LBTF)   ! CALCULATE ONLY
C                                    REQUIRED AND
C                                    COMPLETE BUTTERFLIES
C     ================FREQUENCY SHIFT================
      TWF=ARG*FLOAT(J-1+KINIT)  ! PHASE SHIFTED BY
C                                 'KINIT'
C
      C=COS(TWF)                ! WEIGHT OF IDFT  (REAL)
      S=SIN(TWF)                !                 (IMAG)
C
C     ============PRUNING UNNECESSARY BUNCHES============
      DO 100 K=J,LBTF,NREP      ! THE NEXT BUNCH WITH
```

APPENDIX B-continued

```
C                                     SAME WEIGHT
            J2=K+NBTF                 !   COMPLETE
            CDATA=ZR(K)+ZR(J2)        !   BUTTERFLY IS
            ZR(J2)=(ZR(K)-ZR(J2))*CMPLX(C,S)  ! CALCULATED
            ZR(K)=CDATA               !   HERE
   100   CONTINUE
C
C        ================EXTRACT OUTPUT================
         DO 200 I=1,NA
   200   ZR(I)=ZR(I)/FLOAT(NA)        ! AMPLITUDE SCALING
C
C        ================BIT-REVERSED SORTING================
         NV2=NA/2
         NM1=NA-1
         J=1
         DO 500 I=1,NM1
            IF (I.GE.J) GOTO 300
            T=ZR(J)
            ZR(J)=ZR(I)
            ZR(I)=T
   300      K=NV2
   400      IF (K.GE.J) GOTO 500
            J=J-K
            K=K/2
            GOTO 400
   500   J=J+K
         RETURN
         END
```

We claim:

1. A method for the digital frequency domain implementation of receiving arrays which offers improved resolution in both direction and frequency determination without necessitating sampling rates of the received signal much higher than the Nyquist rate, said receiving arrays having receiving elements, each receiving element defining a channel, said method comprising the steps of:

transforming a discrete time input signal in each channel into N spectral components using an N-point discrete Fourier transform;

removing, in each channel, redundant spectral components, whereby only non-redundant spectral components remain in each channel;

deriving for said non-redundant spectral components in each channel a set of weights comprising weights that are scaled both in amplitude and in phase, so that said set of weights corresponds to $\alpha N$ spectral components, where $\alpha$ is an integer power of 2;

computing products of said non-redundant spectral components in each channel with said derived scaled weights for each channel;

calculating from the so-computed products a first set of spectral sums;

deriving from said first set of spectral sums a second set of spectral sums; and converting said first and second sets of spectral sums to the discrete time domain, using an inverse discrete Fourier transform based on a pruned decimation-in-frequency structure fast Fourier transform, thereby obtaining a discrete time output signal.

2. The method of claim 1, wherein the discrete time input signal is obtained by sampling a continuous time signal that is received by the receiving elements of the array.

3. The method of claim 2, wherein the continuous time signal in each channel is sampled at a uniform sampling rate.

4. The method of claim 3, wherein said uniform sampling rate is substantially the Nyquist rate, which is defined as twice the highest frequency component of the spectrum of said continuous time signal.

5. The method of claim 2, wherein the continuous time signal in each channel passes through an anti-aliasing filter before said continuous time signal is sampled.

6. The method of claim 1, wherein the last $N/2-1$ spectral components in each channel are redundant in the sense that said last $N/2-1$ spectral components in each channel are obtained by taking the complex conjugate of the first $N/2$ spectral components in each channel, barring the first spectral component that corresponds to zero frequency.

7. The method of claim 1, wherein the first $N/2+1$ spectral components in each channel are non-redundant.

8. The method of claim 1, wherein the set of derived weights in each channel of the array is an optimum set of weights which is either deterministic or adaptive, corresponding to N spectral components, for phasing the elements of said array.

9. The method of claim 1, wherein the weights of the set of weights in each channel are scaled both in amplitude and phase so as to correspond to $\alpha N$ spectral components, where $\alpha$ is an integer power of 2, whereby effectively increasing the sampling rate of the input signal by a factor of $\alpha$.

10. The method of claim 1, wherein the products of the non-redundant spectral components in each channel with the scaled set of acquired weights are formed by multiplying the scaled weights of a given frequency and a given channel by the spectral components of the same frequency and the same given channel.

11. The method of claim 1, wherein said first set of spectral sums is derived by summing separately for each non-redundant spectral component the corresponding products from each channel.

12. The method of claim 1, wherein said second set of spectral sums is obtained from said first set of spectral sums by applying the operation of complex conjugation thereto, whereby the second element of said first set of spectral sums is identified with the last element of said second set of spectral sums, and the last element of said first set of spectral sums is identified with the first element of said second set of spectral sums, and the intermediate elements of the two sets are identified correspondingly.

13. The method of claim 1, wherein said discrete time output signal undergoes the further step of being re-scaled thereby restoring the scaling of the discrete time output signal to that of the input signal.

14. A method for the digital frequency domain implementation of transmitting arrays comprising the steps of:
transforming a discrete time input signal into its spectral components;
removing redundant spectral components;
computing a first set of products, for each channel of the array, of non-redundant spectral components with a scaled set of acquired weights;
deriving from said first set of products a second set of products for each channel of the array; and
converting said first and second sets of products to a discrete time output signal in each channel.

15. The method of claim 14, wherein the discrete time input signal is obtained by sampling a continuous time signal.

16. The method of claim 15, wherein the continuous time signal is sampled at a uniform sampling rate.

17. The method of claim 16, wherein said uniform sampling rate is substantially the Nyquist rate, which is defined as twice the highest frequency component of the spectrum of said continuous time signal.

18. The method of claim 15, wherein the continuous time signal passes through an anti-aliasing filter before being sampled.

19. The method of claim 14, wherein the discrete time input signal is transformed into N spectral components using an N-point discrete Fourier transform.

20. The method of claim 14, wherein the last N/2−1 spectral components in each channel are redundant in the sense that said last N/2−1 spectral components in each channel are obtained by taking the complex conjugate of the first N/2 spectral components in each channel, barring the first spectral component which corresponds to zero frequency.

21. The method of claim 14, wherein the first N/2 spectral components are non-redundant.

22. The method of claim 14, wherein the set of acquired weights in each channel of the array is an optimum set of weights which is either deterministic or adaptive, corresponding to N spectral components, for phasing the elements of said array.

23. The method of claim 14, wherein the weights of the set of weights in each channel are scaled both in amplitude and phase so as to correspond to $\alpha N$ spectral components, where $\alpha$ is an integer power of 2, whereby effectively increasing the sampling rate of the input signal by a factor of $\alpha$.

24. The method of claim 14, wherein the first set of products of the non-redundant spectral components with the scaled set of acquired weights are formed by multiplying, for each value of frequency, the spectral components by weights corresponding to the same frequency, for each channel of the array.

25. The method of claim 14, wherein said second set of products is acquired from said first set of products, for each channel of the array, by applying the operation of complex conjugation thereto, whereby the second element of said first set of products is identified with the last element of said second set of products, and the last element of said first set of products is identified with the first element of said second set of products, and the intermediate elements of the two sets are identified correspondingly.

26. The method of claim 14, wherein said first and second sets of products, for each channel, are transformed into the discrete time domain using an inverse discrete Fourier transform based on a pruned decimation-in-frequency structure fast Fourier transform.

27. The method of claim 14, wherein said discrete time output signal, in each channel, undergoes the further step of being re-scaled thereby restoring the scaling of the discrete time output signal, for each channel, to that of the input signal.

28. A system for the digital frequency domain implementation of receiving arrays which offers improved resolution in both direction and frequency determination without necessitating sampling rates of the received signal much higher than the Nyquist rate, said receiving arrays having receiving elements, each receiving element defining a channel, said system comprising:
spectral transforming means for transforming a discrete time input signal in each channel into N spectral components using an N-point discrete Fourier transform;
spectrum filtering means responsive to said spectral components and capable of passing, in each channel, non-redundant spectral components only;
computational means for deriving for said non-redundant spectral components in each channel a set of weights comprising weights that are scaled both in amplitude and in phase, so that said set of weights corresponds to $\alpha N$ spectral components, where $\alpha$ is an integer power of 2;
computational means for computing products of said non-redundant spectral components in each channel with said scaled weights for each channel;
summing means for calculating from the said computed products a first set of spectral sums;
computational means for deriving from said first set of spectral sums a second set of spectral sums; and
processor means for converting said first and second sets of spectral sums to the discrete time domain, using an inverse Fourier transform based on a pruned decimation-in-frequency structure fast Fourier transform, thereby obtaining a discrete time output signal.

29. The system of claim 28, further including an analog to digital processor for converting a continuous time input signal to said discrete time input signal.

30. The system of claim 28, wherein said spectral transforming means is based on an N-point digital Fourier transform.

31. The system of claim 28, wherein said spectrum filtering means is a processor which accepts an input array of spectral components and outputs only part of the input array.

32. The system of claim 28, wherein said means for deriving said second set of spectral sums from said first set of spectral sums is a processor based on applying the operation of complex conjugation to said first set of spectral sums.

33. The system of claim 28, wherein said processor means for converting said first and second sets of spectral sums to said discrete time output signal is based on a pruned decimation-in-frequency structure fast Fourier transform.

34. The system of claim 28, wherein said processor means for converting said first and second sets of spectral sums to said discrete time output signal is followed by a further processor for scaling up said discrete time output signal in order to restore the scaling of said discrete time output signal to that of the input signal.

35. The system of claim 28, wherein said further processor for scaling up said discrete time output signal is followed by a digital to analog processor in order to convert said discrete time signal having original sampling rate and scaling to a continuous time output signal.

36. A system for the digital frequency domain implementation of transmitting arrays comprising:

spectral transforming means for transforming a discrete time input signal into its spectral components;

spectrum filtering means responsive to said spectral components and capable of passing non-redundant spectral components only;

computational means for computing a first set of products, for each channel of the array, of said non-redundant spectral components with a scaled set of acquired weights;

means for deriving from said first set of products a second set of products for each channel of the array; and processor means for converting said first and second sets of products to a discrete time domain output signal in each channel of the array.

37. The system of claim 36, further including an analog to digital processor for converting a continuous time input signal to said discrete time input signal.

38. The system of claim 37, wherein said analog to digital processor is preceded by an anti-aliasing filter.

39. The system of claim 36, wherein said spectral transforming means is based on an N-point digital Fourier transform.

40. The system of claim 36, wherein said spectrum filtering means is a processor which accepts an input array of spectral components and outputs only part of the input array.

41. The system of claim 36, wherein said means for deriving said second set of products from said first set of products is a processor based on applying the operation of complex conjugation to said first set of products.

42. The system of claim 36, wherein said processor means for converting said first and second sets of products to said discrete time output signals is based on a pruned decimation-in-frequency structure fast Fourier transform.

43. The system of claim 36, wherein said processor means for converting said first and second sets of products to said discrete time output signals is followed by a further processor for scaling up said discrete time output signals in order to restore the scaling of said discrete time output signals to that of the input signal.

44. The system of claim 36, wherein said further processor for scaling up said discrete time output signals is followed by a digital to analog processor in order to convert said discrete time signals having original scaling to continuous time output signals.

45. The system of claim 36, wherein said digital to analog processor is followed by a transducer for transmitting said continuous time output signals to a neighboring medium.

46. The system of claim 36, wherein said transducer is an antenna and said continuous time output signals are electromagnetic signals.

47. The system of claim 36, wherein said transducer is associated with at least one of a microphone, a hydrophone, or a geophone and said continuous time output signals are acoustic signals.

* * * * *